Oct. 20, 1931.                S. E. FOUTS                1,828,038
                             HEATING SYSTEM
                            Filed July 6, 1929
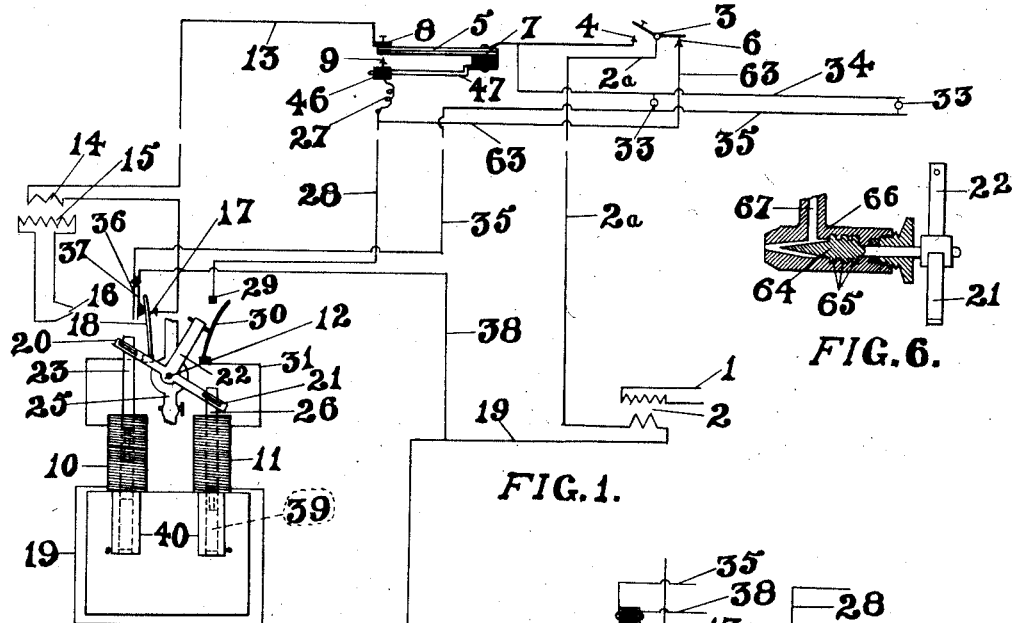
FIG. 1.
FIG. 6.
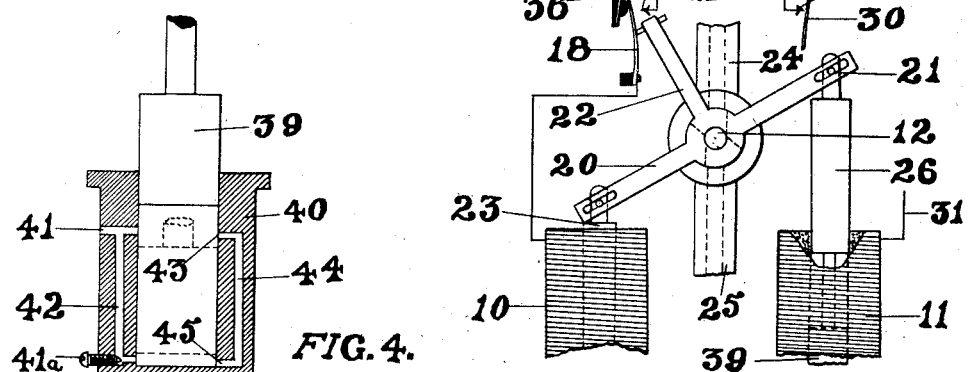
FIG. 4.
FIG. 2.
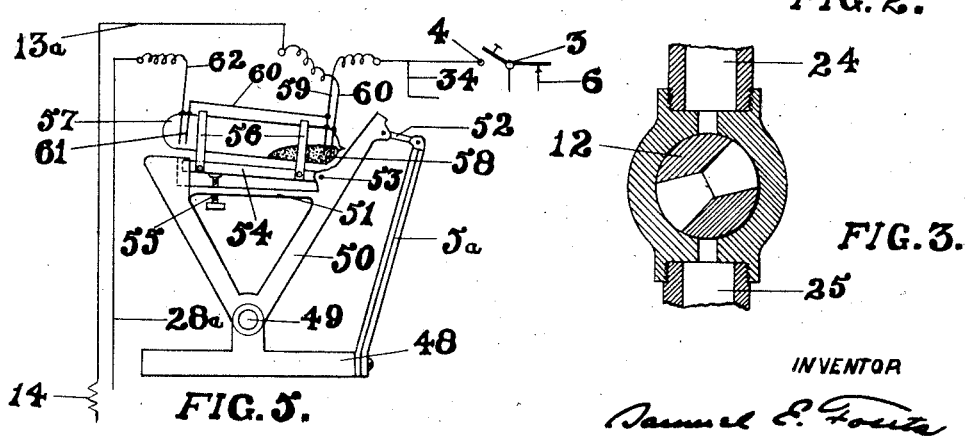
FIG. 5.
FIG. 3.
INVENTOR
Samuel E. Fouts Patented Oct. 20, 1931

1,828,038

UNITED STATES PATENT OFFICE

SAMUEL E. FOUTS, OF LOS ANGELES, CALIFORNIA

HEATING SYSTEM

Application filed July 6, 1929. Serial No. 376,372.

This invention relates to heating systems; and it has for its object the control of the quantity of fuel fed so as, at all times when the system is in operation, to maintain the temperature in the controlling room substantially constant. This object is effected primarily through a thermostat which is in the controlling room, or is open to the atmosphere of such room, whereby the thermostat will respond to changes of temperature in said room and, by so doing, will turn on or off the fuel supply. The invention comprises a sparking device for igniting the fuel when it is first turned on, and means for maintaining the sparking device in action until such time as the fuel has had an opportunity to pass beyond the burner and into igniting position.

While it is realized that the principles of the invention may be embodied in various forms differing more or less in detail, the accompanying drawings show what is now regarded as the preferred embodiment. The claims following this specification are not intended to be limited to the specific structures shown and described any farther than their specific terms necessitate.

Taking up a description of the invention by reference to the accompanying drawings, Fig. 1 is a diagram indicating a valve in the fuel supply passage, a conventional form of thermostat and means for controlling the position of said valve from the thermostat; Fig. 2 is a diagrammatic view showing, on an enlarged scale, a portion of the structure indicated in Fig. 1, but illustrating the valve in its open position; Fig. 3 is a cross sectional view through the fuel control valve and the pipes leading to and from the same; Fig. 4 is a section taken longitudinally through one of the dash pots for retarding the movements of the valve; Fig. 5 is a detailed view of the preferred form of thermostat and of the circuit maker and breaker under control thereof, and Fig. 6 is a longitudinal section through another type of valve, which is primarily intended for supplying liquid fuel.

The heating system herein disclosed is intended to be controlled electrically from a main power circuit, which is indicated at 1 in Fig. 1, said circuit being, in the present instance, for an alternating current. In that circuit there is the primary winding of a step-down transformer 2, by means of which the current may be reduced in voltage from 115, for example, to any lower voltage. The secondary winding of the transformer is connected, through a wire 2a, to a wall switch 3, which, in practice, is preferably located in some part of the building which will serve as a control room. This switch controls two electric circuits, one of which leads from a contact 4 to the thermostat 5, and the other from a contact 6 to other parts of the apparatus later to be described. The structure of the switch is such that, when the circuit is closed through the contact 4, the circuit through contact 6 is broken, and vice versa. Any suitable form of switch which is adapted to open one circuit while it closes another may be employed. It will be noted that, in Fig. 1, all the circuits leading upwardly toward the thermostat are broken to indicate that the thermostat and wall switch are located at points which are remote from the rest of the apparatus.

In Fig. 1, the thermostat 5 is shown as mounted upon an insulating base 7. The thermostat itself is formed of two strips or plates of metal having different coefficients of expansion, the plates being soldered or otherwise secured together so that one side of the thermostat is formed of one metal and the other side of the other metal. In the organization shown, the metal having the higher coefficient of expansion is placed on the upper surface of the thermostat so that, as the temperature in the control room rises, the thermostat bends or curls downwardly at its left hand end so as to break connection with an electric contact 8. If the temperature rises sufficiently, the thermostat distorts until it closes against a contact 9 below the thermostat. In other words, the thermostat projects between the contacts 8 and 9 and may close against either of them, depending upon the temperature in the control room. The contacts 8 and 9 are in circuits which lead, respectively, to solenoids 10 and 11, said solenoids being intended to turn a valve 12 into its open or closed positions respectively. From the contact 8 the current passes through a conductor 13, which includes the primary coil 14 of a step-up transformer, the secondary 15 of which is in a circuit leading to the terminals 16 of a sparking device. In practice, these terminals 16 are located within the furnace above the burner in position to ignite the fuel when the valve shall have opened. While the current in the primary coil may be of relatively low voltage, any desired voltage may be induced in the sparking circuit, as is well understood. From the primary coil 14, the current flows to a stationary contact 17, against which there is normally pressed a light, flexible spring contact 18, thus closing the circuit leading to the solenoid 10. From the latter, the current flows through a wire 19 back to the step-down transformer 2.

Connected with the valve 12 is a member having three arms 20, 21 and 22, the arms 20 and 21 forming an angle of substantially 180 degrees with each other and the arm 22 forming an angle of approximately 90 degrees with the other arms. The arm 20 is pivotally connected to the upper end of a solenoid core 23, said core being adapted to be drawn into the solenoid coil 10 when the latter is energized. When thus attracted, the core rocks the arm 20 and causes the valve to be turned to its opened position, as indicated in Fig. 2. When thus turned, the fuel passes through the pipe 24, through the valve 12 and the pipe 25 to the burner, not shown. As shown in Fig. 3, the passage through the valve is made of such size as to permit the fuel to flow when the valve has moved but a small angular distance and to continue to flow until the valve has been returned almost to its original starting point. The valve is returned to its closed position, as shown in Fig. 3, by the solenoid 11, which draws inwardly the solenoid core 26 until the arm 21 attached to said core is pulled to the position in Fig. 1. The solenoid coil 11 is in a circuit which leads from the contact 9 of the thermostat, through wires 27 and 28 to a stationary contact 29. A light, flexible spring contact 30, similar to the contact 18, is adapted to close against the contact 29 to conduct the current through a wire 31 to the coil 11. When the solenoid coil 11 has drawn the arm 21 almost to the position shown in Fig. 1, the arm 22 strikes the spring contact 30 and forces it away from the contact 29, thus breaking the circuit through the coil 11. Hereinafter the solenoid coils 10 and 11 will be referred to as the opening and the closing coils, respectively.

The operation of the parts thus far described and the results attained will now be set forth. With the parts in the position shown in Fig. 1, the fuel is cut off and no electric current in the system is flowing except in the primary coil of the transformer 2. If the temperature in the control room is too low, the switch 3 is rocked to close against the contact 4. Current then flows from the secondary of the transformer 2 through said switch 3, through the thermostat 5, the wire 13, the primary 14 of the sparking transformer, the contacts 17 and 18, opening coil 10 and wire 19 back to the transformer 2. The effect of this current is to pull the arm 20 from the position shown in Fig. 1 to that shown in Fig. 2, thus to open the valve. Almost as soon as the valve starts to open, the fuel is admitted through the pipes 24 and 25 to the burner, not shown. When the current starts in the circuit described, sparks are formed at the terminals 16, which are located where they will ignite the fuel just as soon as it passes from the burner.

At substantially the end of the opening movement of the valve, the arm 22 strikes against the spring contact 18 and pushes it away from the contact 17, thus automatically breaking the circuit through the opening coil 10. The valve remains in its fully open position until the temperature in the control room has risen to the desired point and the thermostat 5 has distorted to that degree which closes it against the contact 9 on its other side. Current then flows from the transformer 2 through the thermostat 5 and contact 9, through wires 27 and 28, through the contacts 29 and 30, which are now closed against each other, through the wire 31 and the closing coil 11 and back to the transformer 2. The energization of the closing coil now causes a downward pull on the core 26 to rock the valve and the parts connected therewith back to the position of Fig. 1. At substantially the end of this movement, the arm 22 presses back the spring contact 30, as indicated in Fig. 1, thus breaking the closing circuit. In the beginning of the closing movement of the valve, the arm 22 moves away from the spring contact 18 and permits it to close automatically against its contact 17, thus reestablishing the circuit through the opening solenoid, except that said circuit remains broken at the contact 8 of the thermostat. The valve will now remain closed until the temperature in the control room has again lowered to that degree which permits the thermostat to resume its original form and close the circuit at the contact 8, where the cycle of operations is repeated. It will be understood that, owing to the step-down transformer 2, the voltage of the circuits is low and the currents are relatively weak. Therefore, the spring contacts 18 and 30 are made thin and of a metal that is easily flexed, so that their reaction against the lever 22 will not be sufficient to move the valve 12. These contacts, as well as contact spring 37, are similar to those used in telephone receivers.

It is desirable to indicate in the various rooms of the house whether the furnace is in operation. I therefore provide a signal lamp in as many of the rooms of the house as may be desired, said lamps being designated 33 and being arranged in multiple between wires 34 and 35, the wire 34 being connected with the circuit leading from the contact 4 of the wall switch and the wire 35 leading to a spring contact 36, which is suitably mounted on an insulating member. Also mounted on said member is a similar spring contact 37, these contacts being spaced apart when the fuel valve is closed. When the valve is opened, the arm 22, striking the spring contact 18, causes the latter to press the contacts 36 and 37 together to close the circuit between them, when current flows through the signalling circuit above described and through the wire 38 to the wire 19 which leads to the transformer 2. Fig. 2 shows the spring contacts 36 and 37 thus pressed together while the valve is fully opened to permit fuel to pass to the burner. By this construction, any person in any room which is provided with a signal lamp 33 can tell whether the furnace is in operation.

If the arm 22 of the valve were allowed free and uninterrupted movement when the opening solenoid 10 is energized, it would be liable to break the opening circuit at the contact 17 before the fuel had been able to ignite. To retard the movement of this arm and give the sparking circuit time to cause the fuel to ignite, I have provided the dash-pot structure which is indicated in Fig. 1 and shown in detail in Fig. 4. To the lower end of each of the solenoid cores, 23 and 26, I attach a piston 39, each of which operates within a cylinder 40 below the respective solenoid coil. Fig. 4 shows the position of the piston with respect to the cylinder of the opening solenoid when the parts are in the position shown in Fig. 1. When the solenoid 10 is energized and the core 23 is drawn downwardly the piston 39 moves within the cylinder 40. During the first part of this movement the air within the cylinder may escape freely through a port 41; but as soon as the piston has covered this port, the air is compressed within the cylinder. The piston and cylinder are so fitted together that this air can escape but slowly. If desired, the escape of the air may be controlled by a needle valve 41ª, which is adapted to close, more or less, a passage 42 leading from the bottom of the cylinder through the wall thereof to the port 41. By this means the rapidity of escape of the air from the cylinder can be varied. During the compression of the air within the cylinder, the speed of the piston 39 is materially retarded, thus giving opportunity for the gas to reach the sparking terminals and be ignited. Shortly before the piston 39 reaches the end of its stroke, its upper end passes beyond and uncovers a port 43 in the cylinder wall, which port communicates through a passage 44 with another port 45 at the bottom of the cylinder. As soon as the port 43 is thus uncovered, the compressed air in the cylinder is permitted to escape about the piston. This removes the resistance to the movement of the valve and permits the arm 22 to strike the spring contact 18 with a sufficient impact to break the circuit at the contact 17 and to close the spring contacts 36 and 37, thus establishing the signalling circuit.

In Fig. 1, I have shown a dash-pot cylinder 40 for each of the solenoid coils, although one of these dash-pots would ordinarily suffice. In case both be used, one piston will move into one cylinder while the other is moving out of its cylinder. Starting from the bottom of the cylinder, the outward movement of the piston will meet with little or no resistance until the ports 43 and 41 are closed by the piston, after which further movement produces a partial vacuum in the cylinder, thus resisting the movement of the piston. This resistance is maintained and is increased until the piston passes the port 41, when the air is permitted to enter freely below the piston and thus destroy the vacuum therein. This occurs shortly before the end of the movement of the arm 22 and in time to permit said movement to be accelerated to that degree which will operate the spring contacts 18 or 30, as formerly described.

It is desirable that the thermostat be capable of regulation so as to vary the temperature in the control room, as may be desired. In Fig. 1, the contact 9 is shown as mounted upon an insulating member 46, which member is movable along a guide 47 extending substantially parallel to the thermostat 5. When this member 46 is positioned as shown in Fig. 1, a slight distortion of the thermostat is sufficient to cause it to close against the contact 9, thus to shut off the fuel. If it be desired to maintain a higher temperature in the room and a longer fuel flow, this can be accomplished by moving the insulating member 46 and its contact 9 farther to the right, as shown in Fig. 1. Although the thermostat may distort just as much as before, it will not have distorted sufficiently to close against the contact 9 unless the temperature has risen above the degree which sufficed to make such closure before the said member and contact 9 were thus adjusted. By moving this contact 9 farther and farther toward the right, the temperature at which the valve is closed is raised; and the member 46 and contact 9 may be positioned wherever it is necessary to give the desired temperature in the control room.

In Fig. 5, I have shown a modified form of thermostat which is more sensitive than that indicated in Fig. 1 and which I prefer to employ in this heating system. In said figure, the closing switch 3 and the parts which are immediately connected therewith are the same as in Fig. 1. Whereas, in the latter form, the current is led directly through the thermostat, in the form of Fig. 5 the thermostat, which is shown at 5a, does not receive current. It is attached at its lower end to a base 48 upon which there is pivoted, at 49, a V-shaped frame 50, the same being provided with a cross bar 51. The frame 50 is connected, through a link 52, to the upper end of the thermostat 5a; and the construction is such that, as the temperature rises, the thermostat distorts toward the left, thus rocking the frame 50 upon its pivot. Pivoted to the frame at the point 53, is a member 54, the end of which opposite the pivot is suitably guided in the frame 50. For adjusting the movable end of the member 54, a set screw 55 is threaded through the cross bar 51 and is connected to the member 54, the connection being such as to cause the member to be rocked more or less as the screw is turned.

Attached to the member 54 are resilient clamping arms 56 which support a glass tube 57, the later being completely sealed but containing a small quantity of mercury, as indicated at 58. When the parts are in the position shown in Fig. 5, the adjustment of the member 54 with the tube 57 is such as to cause the mercury to travel or gravitate to the right, as is indicated. When the thermostat is heated and distorts toward the left, the frame 50 is so rocked as to cause the tube 57 to be inclined in the opposite direction, with the result that the mercury moves to the other end of the tube, as will be apparent. When the mercury is in the position of Fig. 5, it serves to close an electric circuit through the sealed-in conductors 59 and 60, thus permitting current to flow from the contact 4 of the closing switch 3, through said conductors and the mercury, to the wire 13a, which leads to the opening coil 10 and the primary 14 of the sparking transformer, as previously described. The conductor 59 is connected through a wire 60 to a terminal 61, sealed within the other end of the tube 57. Also within said other end is another terminal 62 which leads to a wire 28a, which corresponds to the wire 28 in Fig. 1.

It will be seen from this description that the thermostatic device of Fig. 5 operates to close alternately a circuit leading to the opening and the closing coils. Since the frame 50 with the tube 57 is movable through a slight arc, the wires connected with the terminals 59, 60, 61 and 62 are made highly flexible as indicated by the loops shown therein.

Since the switch 3 might be opened while the furnace is in operation, I have provided a circuit which automatically closes the fuel valve whenever the wall switch is thus opened. This circuit includes the contact 6 at said switch, which contact is connected, through a conductor 63, to the wire 28 of the closing circuit.

While the valve 12, as shown, is adapted primarily for gaseous fuel, the invention is susceptible of use with liquid fuel when a suitable valve therefor is provided. In Fig. 6, I have shown such a valve, the same being connected with the member having the arms 20, 21 and 22, as shown in Figs. 1 and 2, so as to be rocked by the solenoids 10 and 11, thus to control the electric circuits, as has been described. When the valve, which is indicated at 64, is rocked, coarse threads 65 thereon cause it to move longitudinally within its casing 66, thus to open and close a passage 67 for the liquid fuel.

Instead of the sparking device for ignition, the common pilot light burning fuel from the main fuel supply may be employed, if desired.

I claim:—

1. In a heating system, a burner, a fuel supply member, a valve for said member, an electro-magnetic device for opening said valve, a second electro-magnetic device for closing the valve, electric circuits leading to and including the respective devices, a thermostat device for automatically switching the current from one circuit to the other in accordance with temperature conditions at said thermostat, a source of electric current, a wall switch in the circuit leading from said source, said switch having two contacts, electric connections leading from one of said contacts to the thermostat device, and electric connections leading from the other contact of said switch to the circuit which includes the electro-magnetic device for closing the valve, whereby, when the valve is open and the wall switch is moved to break the circuit which is controlled by the thermostat device, the circuit through the valve-closing electro-magnetic device is established, for the purpose specified.

2. In a heating system, a burner, a fuel supply member, a valve for said member, an electro-magnetic device for opening said valve, a second electro-magnetic device for closing the valve, electric circuits leading to and including the respective magnetic devices, a thermostat device for automatically switching the current from one circuit to the other in accordance with temperature conditions at said thermostat, a source of electric current, a wall switch in the circuit leading from said source, said switch having two contacts, electric connections leading from one of said contacts to the thermostat device, electric connections leading from the other contact of said switch to the circuit which includes the electro-magnetic device for closing the valve, whereby, when the valve is open and the wall switch is moved to break the circuit which is controlled by the thermostat device, the circuit through the valve-closing electro-magnetic device is established, and a signalling circuit including a lamp for showing from a remote point whether the valve is open.

3. In a heating system, a burner, a fuel supply member, a valve for said member, an electro-magnetic coil for causing said valve to open to pass the fuel therethrough, another electro-magnetic coil for causing the valve to close to cut off the fuel, electric circuits including the respective coils, a thermostat for automatically switching the current from one to the other of the said coils whereby the fuel is fed or is cut off in accordance with temperature conditions at the thermostat, a sparking device adjacent the burner and in inductive relation to the circuit through the coil for opening the valve, means movable synchronously with the valve for breaking the circuit through the opening coil and arresting the operation of the igniting device, and means for delaying the breaking of said circuit until the fuel passing through the valve has had time to reach the igniting device.

4. In a heating system, a burner, a fuel supply member, a valve for said member, an electro-magnetic coil for causing said valve to open to pass the fuel therethrough, another electro-magnetic coil for causing the valve to close to cut off the fuel, electric circuits including the respective coils, a thermostat for automatically switching the current from one to the other of the said coils whereby the fuel is fed or is cut off in accordance with temperature conditions at the thermostat, a sparking device adjacent the burner and in inductive relation to the circuit through the coil for opening the valve, means movable synchronously with the valve for breaking the circuit through the opening coil and arresting the operation of the igniting device, means for delaying the breaking of said circuit until the fuel passing through the valve has had time to reach the igniting device and a signalling circuit including an indicator for showing whether the valve is open.

5. In a heating system, a burner, a fuel supply member, a valve for said member, an electro-magnetic coil for causing said valve to open to pass the fuel therethrough, another electro-magnetic coil for causing said valve to close to cut off the fuel, electric circuits including the respective coils, a thermostat for automatically switching the current from one to the other of said coils whereby the fuel is fed or is cut off in accordance with temperature conditions at the thermostat, a sparking device adjacent the burner and in inductive relation to the circuit of the coil for opening the valve, a dash-pot for retarding the opening movement of the valve, and means movable synchronously with the valve for breaking the circuits from the first mentioned coil and the sparking device after the valve has opened and the fuel has had time to reach the sparking device.

6. In a heating system, a burner, a fuel supply member, a valve for said member, an electro-magnetic coil for causing said valve to open to pass the fuel therethrough, another electro-magnetic coil for causing said valve to close to cut off the fuel, electric circuits including the respective coils, a thermostat for automatically switching the current from one to the other of said coils whereby the fuel is fed or is cut off in accordance with temperature conditions at the thermostat, a sparking device adjacent the burner and in inductive relation to the circuit of the coil for opening the valve, a dash-pot for retarding the opening movement of the valve, means movable synchronously with the valve for breaking the circuits from the first mentioned coil and the sparking device after the valve has opened and the fuel has had time to reach the sparking device and a signalling circuit including an indicator for showing whether the valve is open.

7. In a heating system, a burner, a fuel supply member, a valve for said member, an electro-magnetic coil for causing said valve to open, a second electro-magnetic coil for causing the valve to close, electric circuits leading to and including the respective coils, a thermostat for automatically switching the current from one coil to the other, means for automatically breaking the circuits at substantially the ends of the respective movements of the valve, an igniting device operable from the circuit which includes the coil for opening the valve, a dash-pot cylinder, a piston movable in said cylinder, and means connecting the piston with the valve, said cylinder being provided with a port for slowly permitting air to escape as the piston moves into the cylinder and with a port for permitting the air to escape freely as the piston approaches the end of its inward movement, whereby the valve is caused to turn slowly until it is near the end of its movement and then to move quickly to break the circuit through the opening coil and to render the igniting device inactive.

8. In a heating system, a burner, a fuel supply member, a valve for said member, an electro-magnetic coil for causing said valve to open, a second electro-magnetic coil for causing the valve to close, electric circuits leading to and including the respective coils, a thermostat for automatically switching the current from one coil to the other, means for automatically breaking the circuits at substantially the ends of the respective movements of the valve, an igniting device operable from the circuit which includes the coil for opening the valve, a dash-pot cylinder, a piston movable in said cylinder, means connecting the piston with the valve, said cylinder being provided with a port for slowly permitting air to escape as the piston moves into the cylinder and with a port for permitting the air to escape freely as the piston approaches the end of its inward movement, whereby the valve is caused to turn slowly until it is near the end of its movement and then to move quickly to break the circuit through the opening coil and to render the igniting device inactive, and a signalling circuit including a lamp for showing whether the valve is open.

9. In a heating system, a burner, a fuel supply member, a valve for said member, an electro-magnetic coil for causing said valve to open, a second electro-magnetic coil for causing the valve to close, electric circuits leading to and including the respective coils, a thermostat for automatically switching the current from one to the other of said coils, means movable synchronously with the valve for automatically breaking the circuits at substantially the ends of the movements of the valve, a sparking device in inductive relation to the circuit through the opening coil, a dash-pot cylinder, a piston movable in said cylinder, connections between said piston and the valve, said cylinder having an air passage for the escape of air from in front of the piston, means for regulating the size of said passage said cylinder having an additional passage for the air compressed in front of the piston, said additional passage being controlled by the piston and being opened by the latter as it approaches the end of its movement into the cylinder, whereby the dash-pot is adapted to cause the valve to move slowly until it approaches the end of its opening movement and then to permit it to move quickly to said end to break the circuit through the opening coil and to render the sparking device inactive.

10. In a heating system, a burner, a fuel supply member, a valve for said member, an electro-magnetic coil for causing said valve to open, a second electro-magnetic coil for causing the valve to close, electric circuits leading to and including the respective coils, a thermostat for automatically switching the current from one to the other of said coils, means movable synchronously with the valve for automatically breaking the circuits at substantially the ends of the movements of the valve, a sparking device in inductive relation to the circuit through the opening coil, a dash-pot cylinder, a piston movable in said cylinder, connections between said piston and the valve, said cylinder having an air passage for the escape of air from in front of the piston, means for regulating the size of said passage, said cylinder having an additional passage for the air compressed in front of the piston, said additional passage being controlled by the piston and being opened by the latter as it approaches the end of its movement into the cylinder, whereby the dash-pot is adapted to cause the valve to move slowly until it approaches the end of its opening movement and then to permit it to move quickly to said end to break the circuit through the opening coil and to render the sparking device inactive, and a signalling circuit including a lamp for showing whether the valve is open.

11. A heating system comprising a burner, a member through which fuel is supplied to the burner, a valve for said member, an electric circuit including a switch and a coil for causing said valve to open, an electric igniting device adjacent the burner and operable while current flows through said coil, means movable synchronously with the valve for breaking the said circuit and rendering the igniting device inoperative, and means for delaying the breaking of the said circuit until the fuel passing the valve has had time to reach the igniting device.

12. A heating system comprising a burner, a member through which fuel is supplied to the burner, a valve for said member, an electric circuit including a switch and a coil for causing said valve to open, an electric igniting device adjacent the burner and operable while current flows through said coil, means movable synchronously with the valve for breaking the said circuit and rendering the igniting device inoperative, means for delaying the breaking of the said circuit until the fuel passing the valve has had time to reach the igniting device, and a signalling circuit including an indicator for showing whether the valve is open.

13. A heating system comprising a burner, a member through which fuel is supplied to the burner, a valve for said member, an electric circuit including a switch and a thermostat, an electro-magnetic device for causing said valve to open when the thermostat is in one position, a second electro-magnetic device for causing the valve to close when the thermostat is in another position, thus to feed or to cut off the fuel, and a circuit under control of said switch for causing the said second electro-magnetic device to close the valve if the same be open when the switch is operated to break the circuit to the thermostat.

14. A heating system comprising a burner, a member from which fuel is supplied to the burner, a valve for said member, an electric circuit including a switch and a thermostat, an electro-magnetic device for causing said valve to open when the thermostat is in one position, a second electro-magnetic device for causing the valve to close when the thermostat is in another position thus to feed or cut off the fuel, a circuit under control of said switch for causing the said second electro-magnetic device to close the valve if the same be open when the switch is operated to break the circuit to the thermostat, and a signalling circuit including an indicator for showing whether the valve is open.

In testimony whereof I have signed my name to this specification.

SAMUEL E. FOUTS.